(12) United States Patent
Chang et al.

(10) Patent No.: US 8,937,463 B2
(45) Date of Patent: Jan. 20, 2015

(54) COMMON-CORE POWER FACTOR CORRECTION RESONANT CONVERTER

(71) Applicant: Macroblock, Inc., Hsinchu (TW)

(72) Inventors: Lon-Kou Chang, Hsinchu (TW);
Yi-Wen Huang, Hsinchu (TW);
Han-Hsiang Huang, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 167 days.

(21) Appl. No.: 13/714,754

(22) Filed: Dec. 14, 2012

(65) Prior Publication Data
US 2014/0002035 A1 Jan. 2, 2014

(30) Foreign Application Priority Data

Jun. 27, 2012 (TW) .............................. 101123093 A

(51) Int. Cl.
| | |
|---|---|
| *H02M 3/335* | (2006.01) |
| *G05F 1/70* | (2006.01) |
| *H02M 3/137* | (2006.01) |
| *H02M 1/42* | (2007.01) |

(52) U.S. Cl.
CPC .................. *G05F 1/70* (2013.01); *H02M 3/137* (2013.01); *H02M 3/335* (2013.01); *Y02B 70/1433* (2013.01)
USPC ........... 323/207; 363/21.02; 363/89; 323/222

(58) Field of Classification Search
USPC ........... 363/89, 21.02, 21.03, 21.12; 323/205, 323/207, 223, 282, 222
See application file for complete search history.

(56) References Cited

U.S. PATENT DOCUMENTS 6,690,143 B2 * 2/2004 Lin et al. ...................... 323/222

* cited by examiner

*Primary Examiner* — Gary L Laxton
(74) *Attorney, Agent, or Firm* — Morris Manning & Martin LLP; Tim Tingkang Xia, Esq.

(57) ABSTRACT

A common-core power factor correction resonant converter includes an energy-transforming circuit. The energy-transforming circuit receives an input line voltage and generates an output power. The energy-transforming circuit includes a coupling inductor and a charge-storage capacitor. The coupling inductor and the charge-storage capacitor are charged by the input line voltage in response to a control signal, so as to generate a charge-storage capacitor voltage. When the charge-storage capacitor voltage is charged to a preset voltage level, the coupling inductor and the charge-storage capacitor are discharged according to the control signal. Then, the energy in the coupling inductor and the charge-storage capacitor is transformed to the output load and provide the output voltage or current regulation.

9 Claims, 4 Drawing Sheets

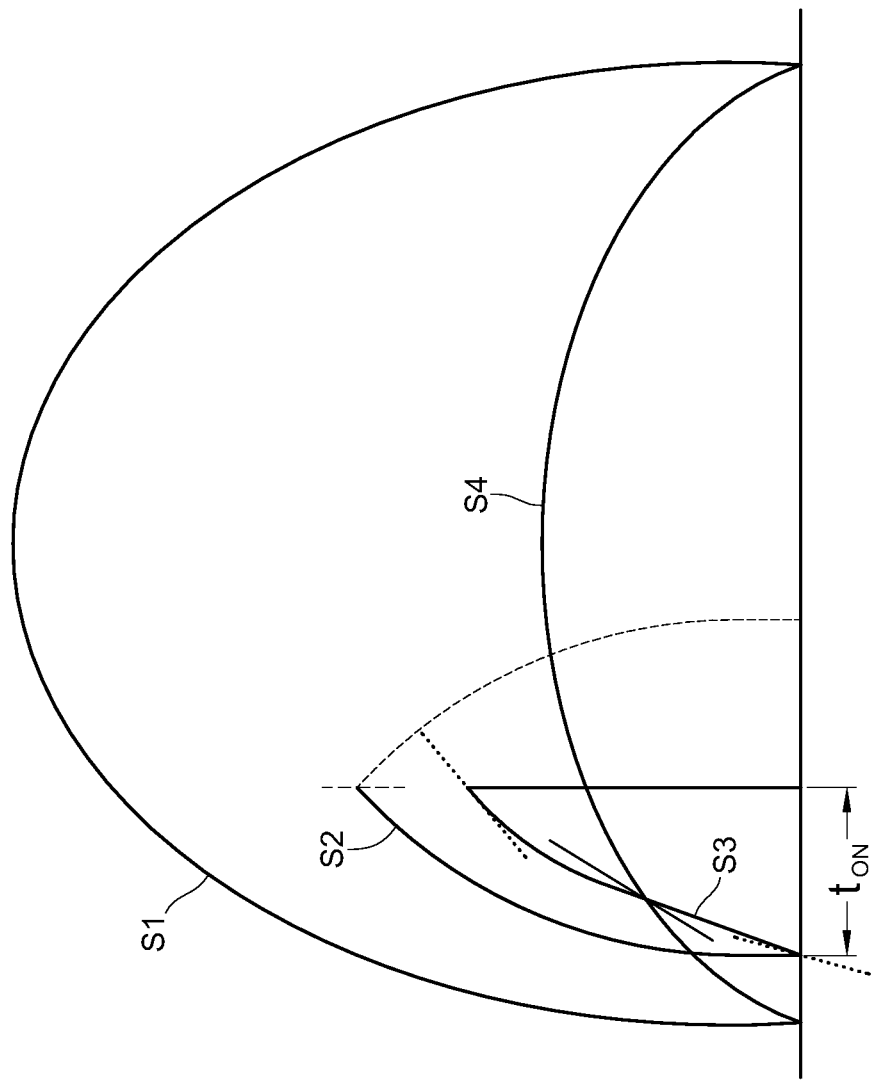

COMMON-CORE POWER FACTOR CORRECTION RESONANT CONVERTER

CROSS-REFERENCE TO RELATED APPLICATIONS

This non-provisional application claims priority under 35 U.S.C.§119(a) on Patent Application No(s). 101123093 filed in Taiwan, R.O.C. on Jun. 27, 2012, the entire contents of which are hereby incorporated by reference.

BACKGROUND

1. Technical Field

The disclosure relates to a power factor correction convertor, and more particularly to a common-core power factor correction resonant converter.

2. Related Art

In general, the circuit structure of a power factor correction converter usually uses the inductors as energy storage devices. The inductor further combines with the boost topology control architecture to achieve power factor correction effect such that the energy may be transferred to the loads. The output voltage of this type of converter must be higher than the voltage of the line power source. Thus the circuit is not suitable for low-voltage output. Therefore, it is necessary to change the circuit to the step-down circuit type, such as the Forward Converter. However, this circuit can not provide high power factor function.

In general, the boost converter requires complex control circuits, such as analog multiplier and other circuit elements to generate a high power factor and regulate the output, in order to achieve high power factor correction. In addition, the aforementioned structure further requires circuits having functions of frequency jitter, a quasi resonant, or a valley switching in order to reduce the Electromagnetic Interference (EMI).

In addition, due to the introduction of the boost topology control architecture for the power factor correction, the output voltage is raised to a higher voltage level, such as 600V. Therefore, a relatively high Drain-Source withstand voltage element (for example, more than 600V power components) must be considered when choosing the switching elements in the framework.

In view of this, the existing technology provides a power factor correction resonant converter, as shown FIG. 1, in order to solve previous problems. The Power Factor Correction resonant converter 100 uses the component 110 for soft switching, so that the input line voltage charges the capacitance CP to produce a charge-storage capacitor voltage VCP. Then the energy transferring operation is conducted by the soft switching operation through element 120, such that the charge-storage capacitor voltage VCP is converted to an output power.

Furthermore, the charge-storage capacitor voltage VCP of the power factor correction resonant converter 100 is charged to the same voltage level as the input line voltage at most. Therefore, a relatively low withstand voltage element can be used. However, the power factor correction resonant converter adopts two separate inductors (elements 110 and 120, respectively), and is implemented by using five diodes, such that the cost and the volume of the circuit elements increase, and the component conduction loss also increase. Therefore, the power factor correction circuit still needs improvement.

SUMMARY

In view of the above, the disclosure provides a common-core power factor correction resonant converter in order to reduce the cost and the volume of the circuit elements. Besides, a relatively low withstand voltage switch and capacitance elements can be chosen. And this circuit architecture can reduce the electromagnetic interference and possess a good power factor.

The disclosure provides a common-core power factor correction resonant converter comprising an energy-transforming circuit. The energy circuit includes a first terminal, a second terminal, and a third terminal. The first terminal of the energy-transforming circuit receives an input line voltage, the second terminal of the energy-transforming circuit is coupled to a ground, and the third terminal of the energy-transforming circuit generates an output power. In addition, the energy-transforming circuit includes a coupling inductor, a charge-storage capacitor, a switch, a first diode, and a second diode.

According to the embodiment of the disclosure, in response to a control signal, the energy-transforming circuit charges the input line voltage to the coupling inductor and the charge-storage capacitor by a switching operation of the energy-transforming circuit, so as to generate a charge-storage capacitor voltage. And then in accordance with the control signal, the energy-transforming circuit enables the coupling inductor and the charge-storage capacitor to discharge and to transfer energy to the output load through the switching operation of the coupling inductor, the charge-storage capacitor, the switch, the first diode, and the second diode of the energy-transforming circuit. Furthermore, a switching operation control can be utilized to provide the output voltage or current regulation.

The disclosure discloses a common-core power factor correction resonant converter. It activates different resonant circuit by the switching operation, in order to acquire input line power and conduct energy-transforming operation to output power. As a result, the disclosure reduces the voltage conversion loss, the cost and volume of the circuit elements. In addition, a relatively low withstand voltage element can be chosen. Furthermore, it maintains a better electromagnetic interference reducing effect and obtains a better power factor.

BRIEF DESCRIPTION OF THE DRAWINGS

FIG. 4 is the waveform of the common-core power factor correction resonant converter in the present disclosure;

DETAILED DESCRIPTION

Figure 1:
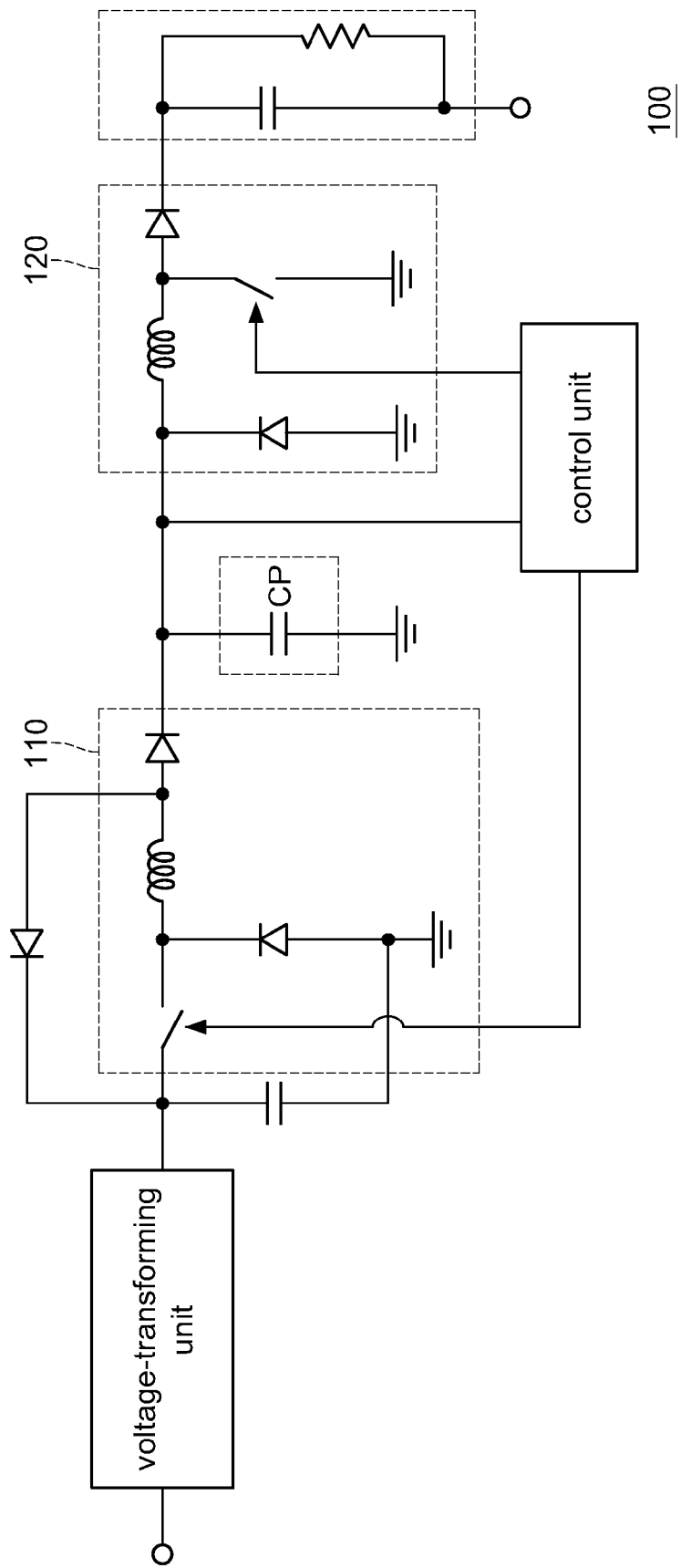
FIG. 1 is a schematic diagram of a power factor correction convertor according to the disclosure.
Figure 2:
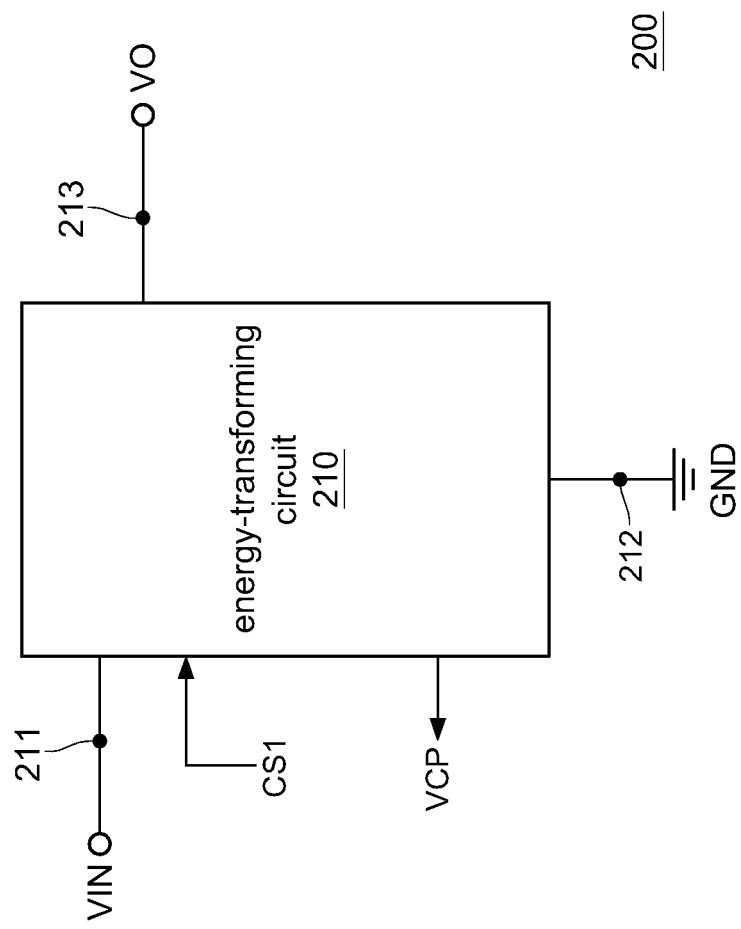
FIG. 2 is a circuitry diagram of a common-core power factor correction resonant converter of the present disclosure.
Figure 3:
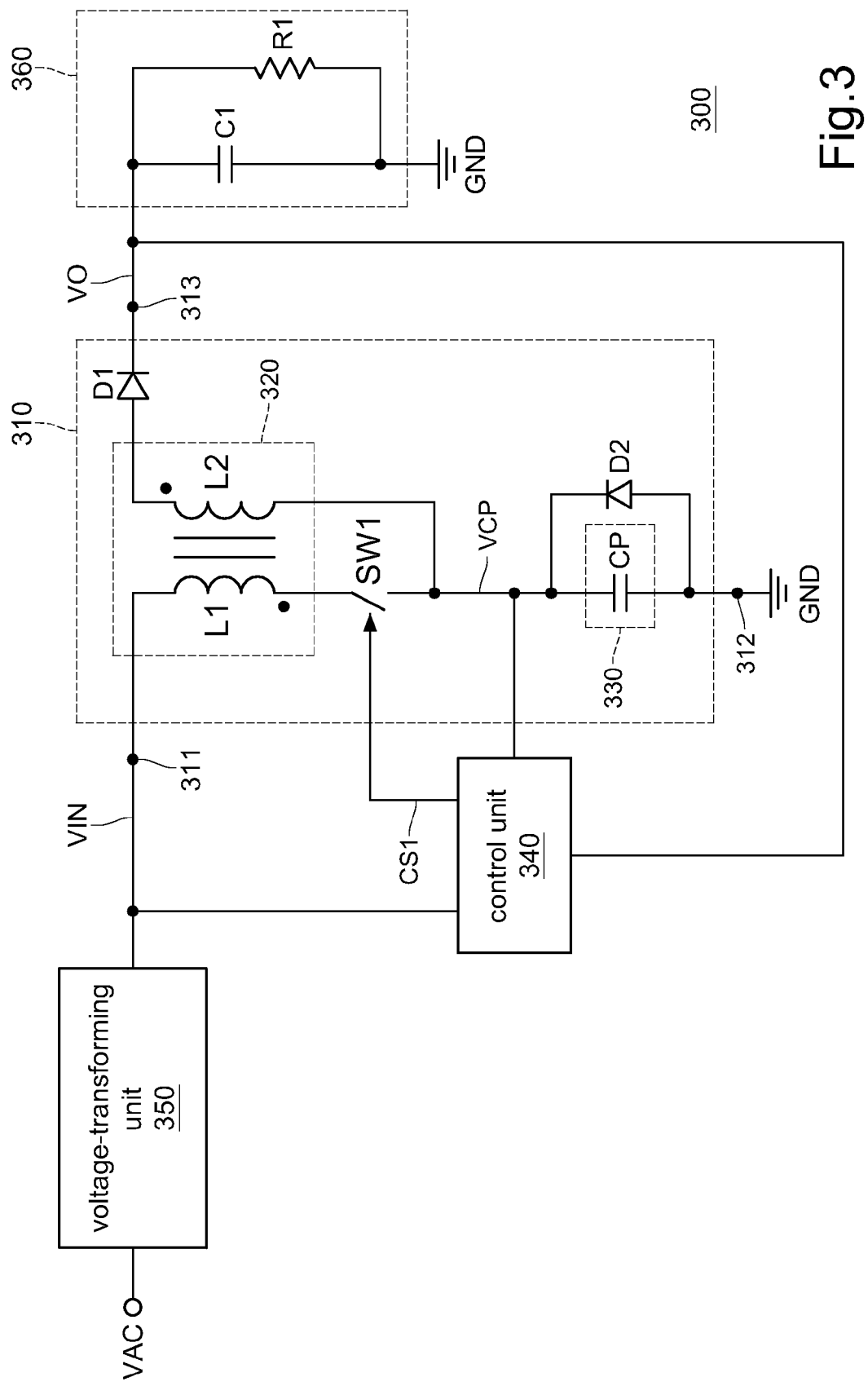
FIG. 3 is an embodiment of the detailed circuit diagram of the common-core power factor correction resonant converter in FIG. 2.

FIG. 2 is a circuitry diagram of a common-core power factor correction resonant converter of the present disclosure. FIG. 3 is an embodiment of the detailed circuit diagram of the common-core power factor correction resonant converter in FIG. 2. Referring to FIG. 2, the common-core power factor correction resonant converter 200 may be referred as a coupling-inductor power factor correction resonant converter. The common-core power factor correction resonant converter 200 includes an energy-transforming circuit 210.

The energy-transforming circuit 210 includes a first terminal 211, a second terminal 212, and a third terminal 213. The first terminal 211 of the energy-transforming circuit 210 receives an input line voltage VIN, the second terminal 212 of the energy-transforming circuit 210 is coupled to a ground GND, and the third terminal 213 of the energy-transforming circuit 210 generates an output power VO.

Furthermore, the energy-transforming circuit 210 includes a coupling inductor, a charge-storage capacitor, a switch, a first diode, and a second diode. The coupling inductor, the charge-storage capacitor, the switch, the first diode, and the second diode of the energy-transforming circuit 210 are shown in the embodiments of FIG. 3. In addition, the volume of the charge-storage capacitor can be very small.

Based on the above, and based on the control signal CS1, the energy-transforming circuit 210 operates a switching operation, the power-obtaining operation from the input line power, by the coupling inductor, the charge-storage capacitor, the switch, the first diode, and the second diode of the energy-transforming circuit 210, such that the coupling inductor and the charge-storage capacitor constitute a resonant circuit. Accordingly, the input line voltage VIN is charged to the magnetizing inductance of the coupling inductor, and the charge-storage capacitor to store energy, so as to generate the charge-storage capacitor voltage VCP.

When the charge-storage capacitor voltage VCP continues to rise and the charge-storage capacitor voltage VCP reaches a preset voltage level (for example, an appropriate voltage level), and then based on the control signal CS1, such that the stored energy from the input line power can be sent to the output. In other words, the energy-transforming circuit 210 enables the coupling inductor and the charge-storage capacitor to discharge and to transfer energy through the switching operation of the coupling inductor, the charge-storage capacitor, the switch, the first diode, and the second diode of the energy-transforming circuit 210, such that the stored energy in the magnetizing inductance of the coupling inductor and the charge-storage capacitor voltage VCP is converted to the output power VO.

In this embodiment, the operation mode for converting the input line power into the output power VO not only includes transferring the stored energy in the magnetizing inductance of coupling inductor element, but also discharging the charge-storage capacitor voltage VCP on the charge-storage capacitor element. The voltage VCP is lowered down toward to 0V and clamped by the second diode while the charge-storage capacitor voltage VCP is converted into the output power VO through the energy conversion. In addition, the input line voltage VIN can be alternating voltage (AC Voltage) or direct voltage (DC Voltage). The alternating voltage is more suitable for power factor correction.

This embodiment of the common-core power factor correction resonant converter 200 can be operated by the switching operation as previously mentioned. First of all, the embodiment acquires power and energy through the coupling inductor and the charge-storage capacitor of the energy-transforming circuit 210, and then converts the acquired power to the output power VO by the energy conversion to provide a well output voltage or output current regulation and obtain a better power factor as well.

Foregoing is only a brief description of the coupling structure associated with the operation of the components in the common-core power factor correction resonant converter 200. The connection between the coupling inductor, the charge-storage capacitor, the switch, the first diode, and the second diode of the energy-transforming circuit 210 are not yet illustrated. It will be illustrated in the following implementations.

Referring to FIG. 3, a common-core power factor correction resonant converter 300 includes an energy-transforming circuit 310, a control unit 340, a voltage-transforming unit 350, and a load unit 360. In this embodiment, the operation of the energy-transforming circuit 310 may refer to the implementation of the energy-transforming circuit 210 in FIG. 2. Therefore, the explanations are not given again.

The energy-transforming circuit 310 includes a first terminal 311, a second terminal 312, and a third terminal 313. The energy-transforming circuit 310 includes a coupling inductor 320 (corresponding to the coupling inductor of the energy-transforming circuit 210 in FIG. 2), a charge-storage capacitor 330 (corresponding to the charge-storage capacitor of the energy-transforming circuit 210 in FIG. 2), the switch SW1 (corresponding to the switch of the energy-transforming circuit 210 in FIG. 2), the diode D1 (corresponding to the first diode of the energy-transforming circuit 210 in FIG. 2) and diode D2, (corresponding to the second diode of the energy-transforming circuit 210 in FIG. 2).

The coupling inductor 320 is a common-core transformer. The coupling inductor 320 includes a primary side and a secondary side. The first terminal of the primary side of the coupling inductor 320 is coupled to a first terminal of the coupling inductor 320 for receiving the input line voltage VIN, wherein the second terminal of the primary side and the first terminal of the secondary side of the coupling inductor 320 have the same polarity. As shown in the marked point in FIG. 3, the primary side and the secondary side of the coupling inductor 320 have opposite polarity.

The coupling inductor 320 further includes a first coil L1 and a second coil L2. The first terminal of the first coil L1 is the first terminal of the primary side of the coupling inductor 320 and the second terminal of the first coil L1 is the second terminal of the primary side of the coupling inductor 320. The first terminal of the second coil L2 is the first terminal of the secondary side of the coupling inductor 320 and the second terminal of the second coil L2 is the second terminal of the secondary side of the coupling inductor 320.

The first terminal of the switch SW1 is coupled to the second terminal of the primary side of the coupling inductor 320. The second terminal of the switch SW1 is coupled to the second terminal of the secondary side of the coupling inductor 320 and the first terminal of the charge-storage capacitor 330. Furthermore, the control terminal of the switch SW1 receives the control signals CS1 and is controlled by the control signal CS1 to turn on or turn off.

Furthermore, the switch SW1 can be implemented by a N-type transistor. For example, the drain of the N-type transistor is coupled to the second terminal of the primary side of the coupling inductor 320, the source of the N-type transistor is coupled to the second terminal of the secondary side of the coupling inductor 320, and the gate of the N-type transistor receives control signals CS1 for example. However, the switch of the implementation is not limited to N-type transistor; it can also use P-type transistor or Insulated Gate Bipolar Transistor (IGBT) to for implementation. In addition, the charge-storage capacitor 330 includes a capacitance CP. For example, the capacitance CP is implemented as the charge-storage capacitor 330.

The anode of diode D1 is coupled to the first terminal of the secondary side of the coupling inductor 320, the cathode of the diode D1 is coupled to the third terminal 313 of the energy-transforming circuit 310 to generate the output power VO. The first terminal of the charge-storage capacitor 330 is coupled to the second terminal of the switch SW1, the first terminal of the charge-storage capacitor 330 generates the charge-storage capacitor voltage VCP, and the second terminal of the charge-storage capacitor component 330 is coupled to the ground GND.

The anode of the diode D2 is coupled to the second terminal of the charge-storage capacitor component 330, and the cathode of the diode D2 is coupled to the first terminal of the charge-storage capacitor component 330. The control unit 340 is applied to receive the input line voltage VIN, the charge-storage capacitor voltage VCP, or the output power VO, so as to generate a control signal CS1 according to the voltage level of the input line voltage VIN, the charge-storage capacitor voltage VCP, or the output power VO.

A control method may be taken for example. When the control unit 340 detects the voltage level of the charge-storage capacitor voltage VCP is 0V, the control signal CS1 with a high logic level is provided to the switch SW1, such that the switch SW1 turns on. When the control unit 340 detects the voltage level of the charge-storage capacitor voltage VCP equals to one half of the input line voltage VIN (ie (1/2)*VIN), the control signal CS1 with the low logic level is provided to the switch SW1, such that the switch SW1 turns off.

The voltage-transforming unit 350 is coupled to the first terminal 311 of the energy-transforming circuit 310 for receiving the alternating voltage VAC and converting the alternating voltage VAC into the input line voltage VIN. Furthermore, the voltage-transforming unit 350 included, for example, a bridge rectifier and a filter, in order to rectify and filter the alternating voltage VAC through the bridge rectifier and the filter, so that the alternating voltage VAC is converted into the input line voltage VIN and then is outputted.

The first terminal of the load unit 360 is coupled to the third terminal 313 of the energy-transforming circuit 310, and the second terminal of the load unit 360 is coupled to the ground terminal GND. In this embodiment, the load unit 360 includes a capacitor C1 and a resistor R1. The first terminal of the capacitor C1 is coupled to the third terminal 313 of the energy-transforming circuit 310, and the second terminal of the capacitor C1 is coupled to the ground GND. The first terminal of the resistor R1 is coupled to the first terminal of the capacitor C1, and the second terminal of the resistor R1 is coupled to the second terminal of the capacitor C1.

As mentioned above, the coupling structure of the internal components of the common-core power factor correction resonant converter 300 is briefly illustrated. The operation of the common-core power factor correction resonant converter 300 will be illustrated in the followings.

First of all, the alternating voltage VAC is transformed and rectified by the voltage-transforming unit 350 in order to generate the input line voltage VIN. In the meanwhile, the control unit 340 detects a charge-storage capacitor voltage VCP is 0V, and then the control unit 340 generates a high logic level control signal CS1 to conduct the switch SW1. Due to turn-on of the switch SW1, the first coil L1 of the coupling inductor 320 and the capacitance CP of the charge-storage capacitor component 330 in energy-transforming circuit 310 constitute a resonant circuit, in order to charge the input line voltage VIN to the magnetizing inductance of the first coil L1 and the capacitance CP of the charge-storage capacitor component 330. Therefore, the voltage of the charge-storage capacitor voltage VCP continues to rise. In other words, when the switch SW1 turns on, the input line voltage VIN charges the capacitance CP of the charge-storage capacitor component 330 through the magnetizing inductance of the primary side of the coupling inductor 320.

When the control unit 340 detects the voltage level of the charge-storage capacitor reaching to a certain voltage, for example, one half of the input line voltage (ie (1/2)*the VIN), the control unit 340 generates a low logic level control signal CS1 in order to disconnect the switch SW1. Due to the disconnect of the Switch SW1, the capacitance CP of the charge-storage capacitor component 330 and the second coil L1 of the coupling inductor 320 constitute a resonant circuit, in order to discharge the magnetizing inductance of the second coil L2 and the capacitance CP of the charge-storage capacitor component 330, so that the magnetic energy in the magnetizing inductance of the second coil L2 and the charge of the capacitance CP of the charge-storage capacitor component 330 conduct an energy transferring and convert into electrical energy for output power VO.

That is, according to the energy releasing of the magnetizing inductance of the second coil L2 and the discharging of the capacitance CP of the charge-storage capacitor component 330 by the energy transferring operation, the energy is converted into the output power VO and the energy of the output power VO is transferred to the load 360. In other words, when the switch SW1 turns off, the polarity of the coupling inductor 320 reverses, making the current on the primary side of the coupling inductor 320 cut off. The current on the secondary side of the coupling inductor 320 is generated, such that the magnetic energy in the magnetizing inductance of the second coil L2 begins to release and the voltage on the capacitance CP of the charge-storage capacitor component 330 discharges and is transferred into the output power VO through the secondary side of the coupling inductor 320.

After releasing the energy, the next switching cycle of the control switch SW1 is waiting to turn on (in this case the voltage level of the charge-storage capacitor voltage VCP is 0V), and then the previous action mentioned above is repeated. According to the switching operation of the aforementioned resonant circuit, acquiring voltage and energy transfer respectively, it can provide the well output voltage or current regulation and obtain a better power factor as well.

The above charge-storage capacitor voltage VCP can be equal to one half of the input line voltage VIN 1/2 (ie (1/2)*VIN). However, the present disclosure is not limited to the example. The voltage level of the charge-storage capacitor voltage VCP can be designed in any appropriate voltage level (i.e. the default voltage level).

The followings will illustrate how the common-core power factor correction resonant converter 300 obtains a better power factor.

First of all, current $I_{L1}$ passes through the primary side of the coupling inductor 320, the initial voltage value of the charge-storage capacitor voltage VCP, and the voltage value, charging to one half of the input line voltage VIN, of the charge-storage capacitor voltage VCP, are shown in the following equations (1), (2), and (3) respectively:

$$I_{L1}(t) = \frac{VIN(t) - VCP(t)}{L1} \times t \quad (1)$$

$$VCP(t) = 0V \mid_{t=0} \quad (2)$$

$$VCP(t) = \frac{VIN(t)}{2} \mid_{t=t_{ON}} \quad (3)$$

Wherein, $t_{ON}$ is the conduction time of the switch SW1, which is the time for the voltage of the capacitance CP of the charge-storage capacitor component 330 charging from 0V to one half of the input line voltage VIN. It should be a fixed value and related to the resonant cycle of the resonant circuit.

Accordingly, when the switch SW1 turns on, the approximated calculation for the average peak current value $I_{L1,peak(avg)}(t)$ of a single switching cycle flowing through the first coil L1 of the coupling inductor 320 calculating by equations (1), (2), and (3) is shown in equation (4):

$$I_{L1,peak(avg)}(t) \sim \frac{\frac{VIN(t)}{L1} - \frac{VIN(t)}{2L1}}{2} \times t_{ON} = \frac{3}{4} \times \frac{VIN(t)}{L1} \times t_{ON} \quad (4)$$

In addition, the relation between the input line voltage VIN and the alternating voltage VAC is shown in equation (5) in the followings:

$$VIN(t) = \sqrt{2} VAC \times \sin(\omega t) \quad (5)$$

Then, when the common-core power factor correction resonant converter 300 operates in the switching frequency $F_{SW1}$ of the Discontinuous Conduction Mode (DCM), the single switching cycle average input line current $I_{in,avg}(t)$ following through can be calculated by equation (6). Equation (6) is shown in the following:

$$\begin{aligned} I_{in,avg}(t) &= <I_{L1}(t)> T_{SW1} \quad (6)\\ &= \frac{I_{L1,peak(avg)}(t)}{2} \times \frac{t_{ON}}{T_{SW1}} \\ &= \frac{3VIN(t)}{8L1} \times \frac{t_{ON}^2}{T_{SW1}} \\ &= \frac{3\sqrt{2}\, VAC \times \sin(\omega t)}{8L1} \times \frac{t_{ON}^2}{T_{SW1}} \\ &= k \times \sin(\omega t) \end{aligned}$$

Wherein, $F_{SW1}$ is the switching frequency of the switch SW1, $T_{SW1}$ is the switching cycle of the switch SW1, and $F_{SW1}$ is the reciprocal of $T_{SW1}$, for example $$F_{SW1} = \frac{1}{T_{SW1}}.$$

According to equation (6), it is shown that $I_{in,avg}(t)$ is proportional to sin ωt. The sinusoidal waveform is obtained as the alternating voltage VAC as shown in FIG. 4.

Referring to FIG. 4, it shows the operating waveform of the common-core power factor correction resonant converter in the present disclosure. Wherein, curve S1 is the input line voltage VIN; curve S2 is the charge-storage capacitor voltage VCP; curve S3 is the inductor current $I_{L1}(t)$ passing through the first coil L1 of the primary side of the coupling inductor 320 when the switch SW1 turns on; and the curve S4 is the average input line current $I_{in,avg}(t)$ passing through the capacitance CP of the charge-storage capacitor 330 when the switch SW1 turns.

It can be seen from FIG. 4, the sinusoidal waveform of the average input line current $I_{in,avg}(t)$ (curve S4) and the input line voltage VIN (curve S1) are the same. Therefore, the common-core power factor correction resonant converter can obtain a good power factor. In addition, the inductor current $I_{L1}(t)$ of each cycle on the first coil L1 is approximated to a parabola waveform instead of the traditional saw tooth waveform. It is expected to obtain a good reduction of the electromagnetic interference effect.

The on-off of the control switch SW1 is controlled by a varying-frequency control mode, that is to say detecting the voltage level of the input line voltage VIN and the charge-storage capacitor voltage VCP in order to control the conducting of the switch SW1. However, the implementation of the disclosure is not limited. The pulse width modulation (PWM) fixed-frequency control method can also be used to control the conduction of the switch SW1, so as to control the conduction time $t_{ON}$ of the switch SW1.

An example is illustrated in the followings. An input line power $P_{in}(t)$ of the common-core power factor correction resonant converter 300 can be calculated by equation (7). The approximated equation (7) is shown in the followings:

$$\begin{aligned} P_{in}(t) &= P_{Lp}(t) + P_{Cp}(t) \quad (7) \\ &= \frac{1}{2} L_P [I_{Lp,peak(avg)}(t)]^2 \times F_{SW} + \frac{1}{2} C_P \left[\frac{V_{in}(t)}{2}\right]^2 \times F_{SW} \\ &= \frac{1}{2} L_P \left[\frac{3\sqrt{2}\, V_{AC} \times \sin(\omega t)}{4 L_p} \times t_{ON}\right]^2 \times F_{SW} + \\ &\quad \frac{1}{2} C_P \left[\frac{\sqrt{2}\, V_{AC} \times \sin(\omega t)}{2}\right]^2 \times F_{SW} \\ &= \left(\frac{9 t_{ON}^2}{16 L_p} + \frac{C_P}{4}\right) \times V_{AC}^2 \times F_{SW} \times \sin^2(\omega t) \end{aligned}$$

An output power $P_{out}(t)$ of the common-core power factor correction resonant converter 300 can be calculated by equation (8). The approximated equation (8) is shown in the followings:

$$\begin{aligned} P_{out}(t) &= \eta \cdot P_{in}(t) \quad (8) \\ &= \eta \cdot \frac{1}{T_{line}} \int_0^{T_{line}} \left(\frac{9 t_{ON}^2}{16 L_p} + \frac{C_P}{4}\right) \times V_{AC}^2 \times F_{SW} \times \sin^2(\omega t) \, dt \\ &= \eta \cdot \left(\frac{9 t_{ON}^2}{32 L_p} + \frac{C_P}{8}\right) \times V_{AC}^2 \times F_{SW} \end{aligned}$$

Wherein, η is the efficiency between the input line power $P_{in}(t)$ and the output power $P_{out}(t)$.

In this embodiment, the voltage level of the charge-storage capacitor voltage VCP of the charge-storage capacitor 330 on the capacitance CP is charged to one half of the input line voltage VIN (ie (1/2)*VIN) at most. Therefore, a relatively low withstand voltage capacitance CP can be implemented. In addition, the input line voltage VIN applied in the disclosure is alternating voltage. However, the present disclosure is not limited to the embodiment so that the input line voltage VIN can also use direct voltage.

The disclosure provides a common-core power factor correction resonant converter. It activates different resonant circuit by switching operations, in order to obtain power and conduct energy-transforming operation to output power. As a result, it can generate a well output voltage, current regulation and obtain a better power factor as well.

In addition, the voltage of the charge-storage capacitor is charged to one half of the input line voltage VIN at most, such that relatively low withstand voltage switching elements and capacitive elements can be implemented, and the cost and the volume of circuit elements can also be reduced. Furthermore, the energy-transforming circuit of the disclosure is implemented by using a coupling inductor, a charge-storage capacitor, a switch, and two diodes. Comparing to the prior art of the power factor correction resonant converter, the disclosure can effectively reduce the volume of the circuit, and reduce the conduction losses from the components.

While the present invention has been shown and described in connection with the exemplary embodiments, it will be apparent to those skilled in the art that modifications and variations can be made without departing from the spirit and scope of the invention as defined by the appended claims.

What is claimed is:

1. A common-core power factor correction resonant converter, comprising:
   an energy-transforming circuit, having a first terminal, a second terminal, and a third terminal, the first terminal of the energy-transforming circuit receives an input line voltage, the second terminal of the energy-transforming circuit is coupled to a ground, the third terminal of the energy-transforming circuit generates an output power, and the energy-transforming circuit comprises a coupling inductor, a charge-storage capacitor, a switch, a first diode, and a second diode;
   wherein, in response to a control signal, the energy-transforming circuit charges the input line voltage to the coupling inductor and the charge-storage capacitor by a switching operation of the coupling inductor, the charge-storage capacitor, the switch, the first diode, and the second diode of the energy-transforming circuit, so as to generate a charge-storage capacitor voltage, and then in accordance with the control signal, the energy-transforming circuit enables the coupling inductor and the charge-storage capacitor to discharge and to transfer energy to an output load through the switching operation of the coupling inductor, the charge-storage capacitor, the switch, the first diode, and the second diode of the energy-transforming circuit, such that stored energy in the coupling inductor and the charge-storage capacitor is converted to the output power,
   wherein the coupling inductor is a common-core transformer, the coupling inductor comprises a primary side and a secondary side, a first terminal of the primary side is coupled to the first terminal of the energy-transforming circuit, wherein a second terminal of the primary side and a first terminal of the secondary side have the same polarity;
   a first terminal of the switch is coupled to the second terminal of the primary side, a second terminal of the switch is coupled to a second terminal of the secondary side, a control terminal of the switch receives the control signal;
   an anode of the first diode is coupled to the first terminal of the secondary side, a cathode of the second diode is coupled to the third terminal of the energy-transforming circuit;
   a first terminal of the charge-storage capacitor is coupled to the second terminal of the switch, a second terminal of the charge-storage capacitor is coupled to the ground; and
   an anode of the second diode is coupled to a secondary side of the charge-storage capacitor, a cathode of the second diode is coupled to a primary side of the charge-storage capacitor.

2. The common-core power factor correction resonant converter according to claim 1, wherein the coupled inductor comprises:
   a first coil, a first terminal of the first coil is the first terminal of the primary side, a second terminal of the first coil is the second terminal of the primary side; and
   a second coil, a first terminal of the second coil is the first terminal of the secondary side, a second terminal of the second coil is the second terminal of the secondary side.

3. The common-core power factor correction resonant converter according to claim 1 wherein the charge-storage capacitor comprises a capacitor.

4. The common-core power factor correction resonant converter according to claim 1, wherein the switch is an n-type transistor, a p-type transistor, or an insulated gate bipolar transistor.

5. The common-core power factor correction resonant converter according to claim 1, further comprising:
   a control unit, for receiving the input line voltage, the charge-storage capacitor voltage, or controlling by a pulse width modulation fixed frequency mode to generate the control signal.

6. The common-core power factor correction resonant converter according to claim 1, further comprising:
   a voltage-transforming unit, coupled to the first terminal of the energy-transforming circuit to receive an alternating voltage and transfers the alternating voltage to the input line voltage.

7. The common-core power factor correction resonant converter according to claim 1, further comprising:
   a load unit, wherein a first terminal of the load unit is coupled to the third terminal of the energy-transforming circuit, and a second terminal of the load unit is coupled to the ground.

8. The common-core power factor correction resonant converter according to claim 7, wherein the load unit comprises:
   a capacitor, a first terminal of the capacitor is coupled to the third terminal of the energy-transforming circuit, and a second terminal of the capacitor is coupled to the ground; and
   a resistor, a first terminal of the resistor is coupled to the first terminal of the capacitor, and a second terminal of the resistor is coupled to the second terminal of the capacitor.

9. The common-core power factor correction resonant converter according to claim 1, wherein the input line voltage is an alternating voltage or direct voltage.

* * * * *